W. Weicker,
Pencil Rubber-Tip Mold.
No. 102,894.  Patented May 10, 1870.
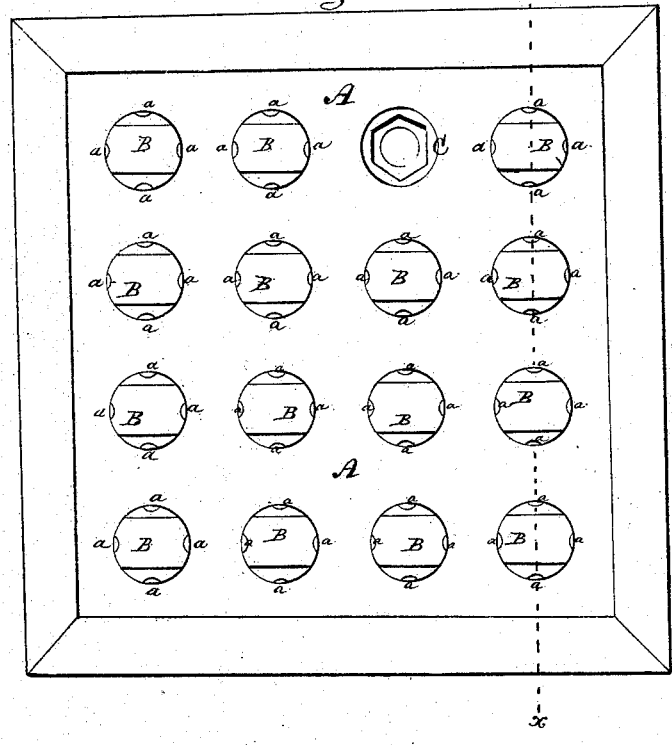
Fig: 1.
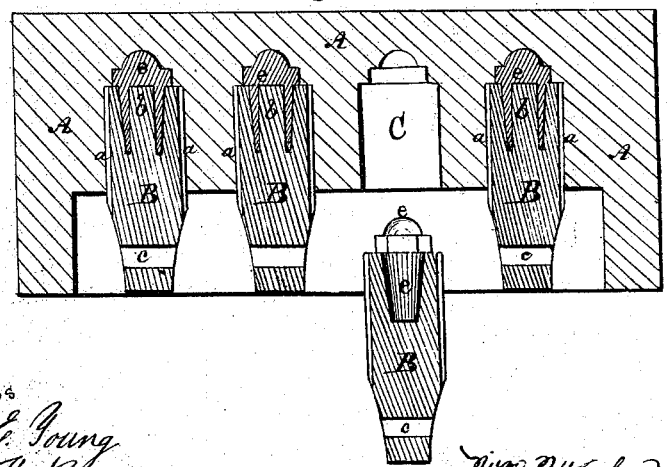
Fig: 2.
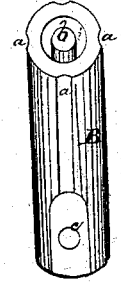
Fig: 3.
Witnesses
F. E. Young
J. F. Reese
Wm. Weicker
By J. C. Fay & Co.
Attys.

United States Patent Office.

WILLIAM WEICKER, OF BLACKSTONE, MASSACHUSETTS.

Letters Patent No. 102,894, dated May 10, 1870.

IMPROVEMENT IN MOLDS FOR MAKING RUBBER PENCIL TIPS.

The Schedule referred to in these Letters Patent and making part of the same.

*To all whom it may concern:*

Be it known that I, WILLIAM WEICKER, of Blackstone, in the county of Worcester and State of Massachusetts, have invented a new and improved Mold for Making Rubber Pencil-Tips; and I do hereby declare the following to be a full, clear, and exact description of the same, reference being had to the accompanying drawings, in which—

Figure 1 is a plan view of my improved pencil-tip mold, showing one of the sockets thereof with the puncher withdrawn.

Figure 2 is a transverse vertical section of the same, taken in line $x$ $x$ of fig. 1, illustrating one of the punchers withdrawn, and the rubber pencil-tip on the central stem of said puncher.

Figure 3 is a perspective view of my improved puncher, with the rubber tip removed.

In each of the figures the same letters of reference denote like parts.

The nature of my invention consists in making the mold in one section or die-box, provided with the required shaped sockets or molds, to contain the rubber from which the pencil-tip is fashioned, by means of inserting within said sockets containing the requisite quantity of rubber, punchers having four or more grooves or channels at intervals along their outer sides, to carry off the surplus rubber from the sockets in which the pencil-tips are formed.

The mold-plate A is formed in but one section, and provided with a given number of sockets or annular molds, C, the lower cavities of which extend beyond the end of the punchers, and may be hexagonal, as shown in fig. 1 of the drawings, or otherwise shaped.

The punchers B correspond in size to the annular sockets C, and are provided on their outer sides with longitudinal grooves or channels $a$, and a central inner stem, $b$, within the annular socket $i$, as shown clearly in fig. 3 of the drawings.

Apertures $c$ in the ends of the punchers serve for a rod to be passed through them, and thus a series of the punchers may be withdrawn at the same time.

To obviate the difficulty of the plates or molds sticking together by reason of the surplus rubber getting between them, which is the case where the mold is made in more than one section, and to do away with the necessity of removing the bottom plate of said sections, I form the sockets or molds of any required size or form in one plate, and provide the punchers with four or more grooves or channels, through which the surplus rubber oozes up, and is deposited upon the upper face or top plate A, ready for removal.

To insure a sufficient quantity of rubber from which to make the required pencil-tip, I prefer to place a part of the rubber in the socket or mold C and a part in the annular recess on the end of the puncher B, thus seldom, if ever, making a defective tip by reason of an insufficient quantity of rubber.

The sockets C and annular recess $i$, in the ends of the punchers B, having been supplied with the requisite amount of rubber, the punchers are then inserted within said sockets, and a board is placed over the ends of the punchers, and screwed down as a press until the punchers are brought to the position within their molds, as shown in fig. 1, steam at the same time acting on the rubber. Thus the tips $e$ are fashioned, and, on removing said board and withdrawing the punchers, the rubber tips remain on the ends of the punchers until removed therefrom.

I claim as my invention—

1. A mold-plate for making rubber pencil-tips, formed in but one section, substantially in the manner and for the purpose herein set forth.

2. The grooves or channels $a$ on the punchers B, substantially as and for the purpose hereinbefore specified.

3. The combination of a mold-plate A, molds C, punchers B, channels $a$, central stem $b$, and annular recess $i$, when constructed and arranged substantially as and for the purpose herein set forth.

WILLIAM WEICKER.

Witnesses:
ARTHUR A. PUTNAM,
DAVID HEINEMANN.